Jan. 17, 1933.   S. COOPER   1,894,345
METHOD OF MAKING TEA BAGS
Filed April 6, 1931   2 Sheets-Sheet 2

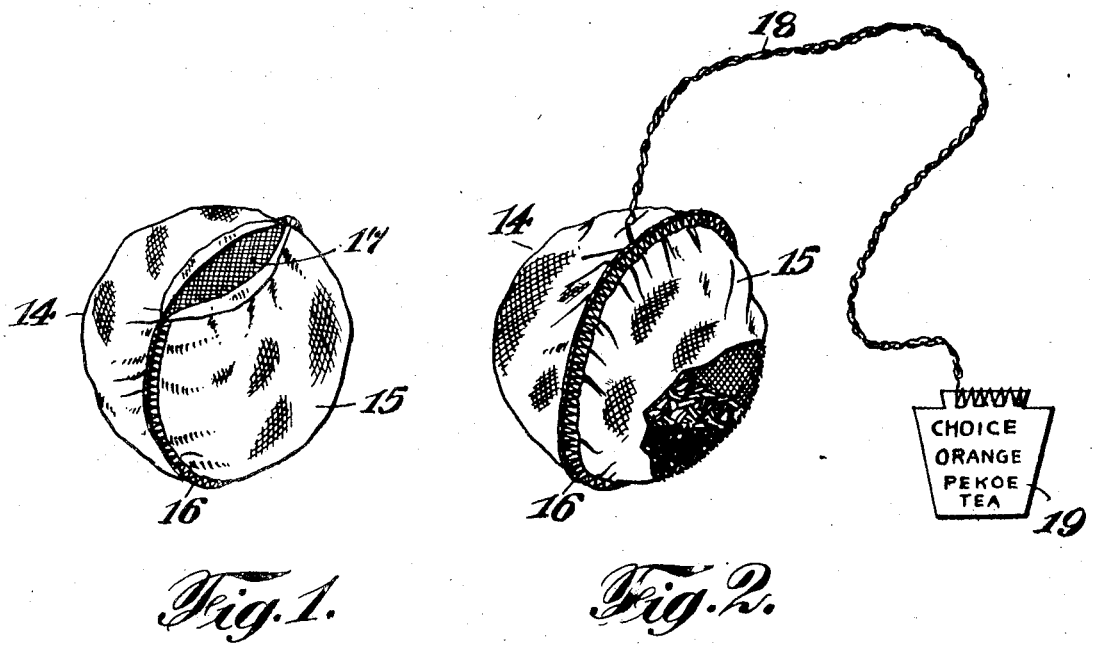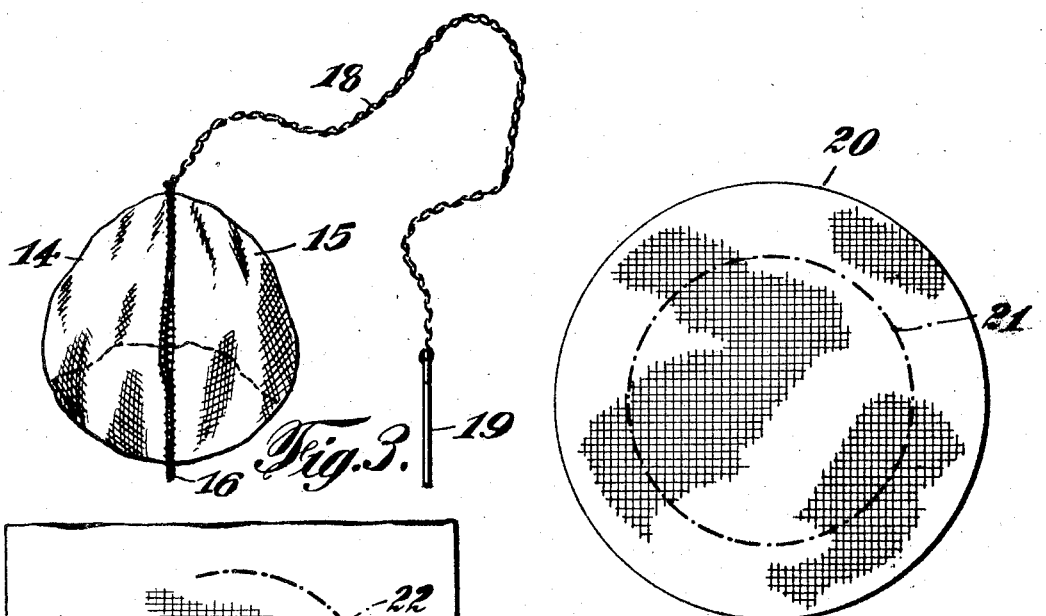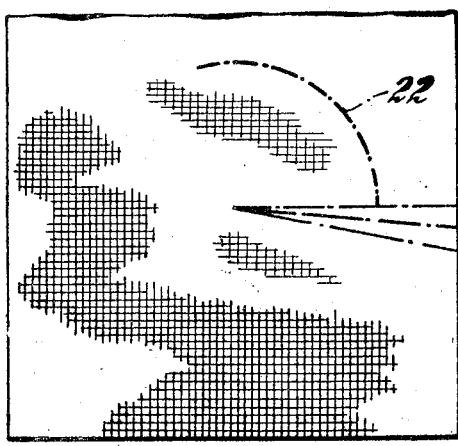

INVENTOR.
Simon Cooper
BY Ramsey & Kent
ATTORNEYS.

Patented Jan. 17, 1933

1,894,345

UNITED STATES PATENT OFFICE

SIMON COOPER, OF BROOKLYN, NEW YORK, ASSIGNOR TO COOPER TEA PACKET CO. INC., OF BROOKLYN, NEW YORK, A CORPORATION OF NEW YORK

METHOD OF MAKING TEA BAGS

Application filed April 6, 1931. Serial No. 528,029.

This invention relates to tea bags and methods of making the same. The "tea bag" might be more appropriately termd a "tea packet" since it is ordinarily made and marketed with the tea in it. However, it is customarily called a "tea bag". Usually the bags are of a size suitable for brewing one or two cups of tea, and are referred to as individual tea bags. The bags, however, may be of larger sizes for use by hotels, restaurants, etc., in making ice tea in bulk.

Heretofore various forms of gauze or fabric bags have been used as individual tea bags. These prior art bags have been more or less satisfactory in some respects; but they have had disadvantages, including cost, appearance, and objectionable effect upon the flavor of the brew. Since individual tea bags are used only once and then thrown away, low cost is of prime commercial importance, and small fractions of a cent per bag may be vital. Anything besides tea leaves which is introduced into the brew affects the flavor and one of the problems has been to so minimize the flavor effect of the gauze or fabric as to render it unobjectionable. Obviously the more gauze that is present in the tea bag, the more the gauze affects the flavor of the brew. On the other hand, it is very desirable that the gauze of the bag shall provide sufficient space within the bag to permit free expansion of the tea leaves so that all of the leaves will be exposed to the hot water for quick and complete extraction of tea essence. Attempts have been made to minimize the flavor effect of the bag material by using specially treated gauze or fabric but this increases the cost and does not eliminate the adverse flavor to the extent that is desirable.

A type of bag which is much used is a square bag made from two layers of fabric overseamed together. This bag has various advantages, but in use, it has one very annoying disadvantage. With this type of bag, the squares of cloth have to be fairly large to give adequate space for expansion of the tea leaves. When the bag is removed from a tea cup and placed on the saucer, one of the corners often projects over the edge of the saucer and from it tea drips onto the table cloth.

A principal object of the present invention is to provide a method of making a tea bag which provides ample surplus space for the expansion of the tea while requiring a minimum amount of bag making material for a given volume of bag, thus saving material and minimizing the amount of extraneous material introduced into the brew.

Another object of the invention is to provide a low cost tea bag and/or method of making the same.

A secondary object of the invention is to improve the appearance of individual tea bags.

Other objects of the invention will be obvious from the present disclosure.

In the form of the invention disclosed a generally spherical bag is produced by overseaming together two hemispherical pieces of bag making material. Ordinarily, the bag making material will be gauze or fabric but other materials such as perforated papers or cellophane may be used. The two halves of the bags may be made hemispherical in any suitable manner, e. g. by circumferentially gathering the material at or prior to the sewing operation. Of course where limp material is used, the bag will not initially stand in spherical form, because it is only partly filled with tea leaves. However, the bag is adapted to be distended into spherical form without any substantial internal pressure being exerted upon it. Thus in brewing, the tea leaves are permitted to expand without restraint, the bag readily assuming spherical form and thereby providing maximum space for the expansion. For satisfactory and economical brewing the total volume of the bag should provide for 3:1 expansion. In the drawings, the bags are shown distended for the sake of clarity.

Fig. 1 is a perspective view showing a partially completed tea bag ready for filling.

Fig. 2 is a perspective view showing a completed tea bag with a section cut away to show the charge of tea leaves.

Fig. 3 is a side elevation of a completed tea bag.

Fig. 4 is a diagrammatic view showing the relation between the area of cloth required for making one-half of the bag and the circumference on which the halves are sewed.

Fig. 5 is a diagrammatic view illustrating one method of making the bag.

Figure 6:
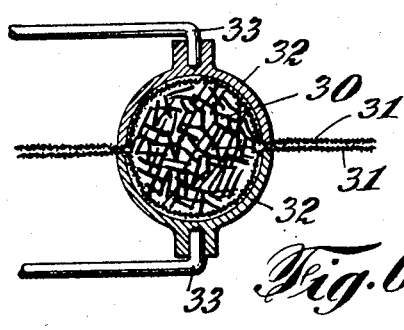
Figs. 6, 7, 8 and 9 are sectional views showing more or less diagrammatically means for holding bag material and a charge of tea for sewing into a tea bag or packet.

In Fig. 1, two pieces of textile material 14 and 15 are circumferentially gathered into hemispherical form as shown in the drawing; and throughout a major portion of their circumferences, they are joined together by overlock stitching 16. An opening 17 is left for introducing the charge of tea into the bag. The overseaming 16 and sewing machines for producing it are well known in the art. As shown in the drawings, the stitches pass over the cut edges of the fabric, thus preventing ravelling of the fabric. After the charge of tea has been inserted through the opening 17, the opening is closed by overseaming; and the stitching is chained off, as is well understood in the art, to produce a cord 18 to the end of which a tag 19 is stitched. This produces the complete bag shown in Figs. 2 and 3, ready for use.

Overseaming sewing machines are usually equipped with a cutter or trimmer which trims the cloth as it is sewed, thus giving a fresh cut edge over which the stitches are cast. The bag may be made from round blanks (Fig. 4) or from square blanks (Fig. 5). When made from square blanks, the trimmer is used to trim the blanks into circular form (of the desired size) as the sewing progresses in a circular path. When the bag is made from circular blanks, the trimmer trims off an annular section so that the cloth actually put into the bag is somewhat less than the total blank shown in Fig. 4. In Fig. 4, the outer circumference 20 indicates approximately the initial size of a circular blank, and the dot-dash circle 21 indicates the circumference of the line of stitching 16. The trimmer cuts between circles 20 and 21, ordinarily quite close to 20; and the circumference of the remaining cloth is reduced in any suitable manner to bring it to circumference 21, as by circumferentially gathering the cloth.

The circumferential gathering of the cloth may be effected in various ways, one of which is illustrated in Fig. 5. The stitching 16 is to be on a circumference of a size represented by arc 22, but the area of the trimmed blank is to be greater than the area which would be enclosed by a circle corresponding to arc 22. One way of effecting this result is to stitch with stitches having a length represented by arc 24, and at each stitch feeding an amount of material represented by arc 25. Thus, the material is circumferentially gathered as it is sewed. This can be done either by hand or on a sewing machine. With a sewing machine, it is only necessary to sew in a circular path and provide feed mechanism which feeds the cloth to the needle faster than it is led away from the needle.

In Fig. 6, a charge of tea 30 is placed between two layers of gauze or other suitable material 31, 31 and then confined within two hemispherical holders 32, 32 which may be held in any suitable manner as by pivots 33, 33. This circumferentially gathers the gauze; and the two layers of cloth 31, 31 are then stitched together along a circular path with a suitable overseaming machine, the shells 32, 32 revolving on the pivots 33, 33 as the sewing progresses. To give the bag a more nearly spherical form, the cloth may be additionally circumferentially gathered as it is sewed, as illustrated in Fig. 5.

Figure 7:
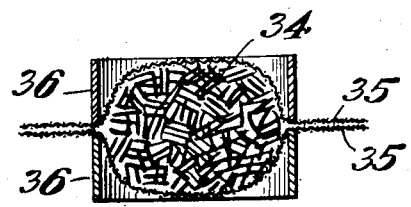

In Fig. 7, a charge of tea 34 is placed between two layers of cloth 35, 35 and confined near the center of the layers by rings 36, 36. The cloth so held is stitched together in a circular path by procedure similar to that described in connection with Fig. 6.

Figure 8:
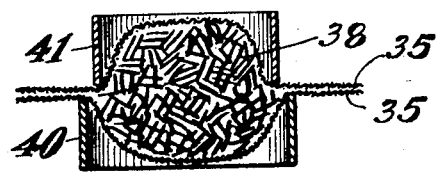
Figure 9:
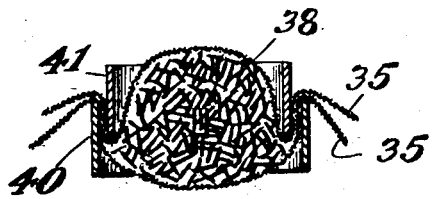

In Fig. 8, the charge of tea 38 is confined between two rings 40 and 41, one of which is adapted to telescope within the other into the position shown in Fig. 9. When so telescoped, the cloth is considerably gathered circumferentially and the bag is completed by overseaming the edges of the cloth together in a circular path.

Figure 10:
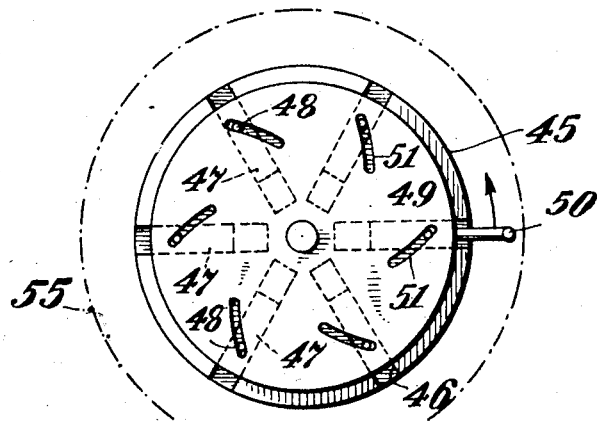
Fig. 10 is a more or less diagrammatic plan view of a mechanism for holding material for sewing into a bag.
Figure 11:
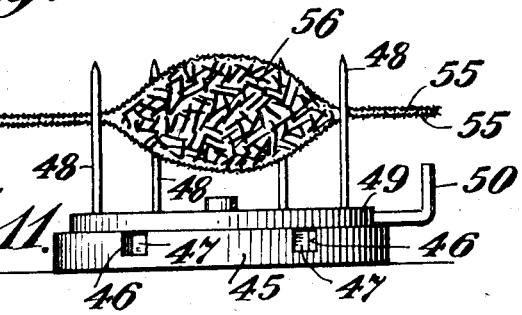
Fig. 11 is an elevation of the mechanism shown in Fig. 10 with the holding pins in extended relation.
Figure 12:
Fig. 12 is a view similar to Fig. 11 but with the holding pins in contracted position.

In Figs. 10, 11 and 12, a base 45 is provided with radial guide-ways 46 in each of which is positioned a radially movable slide 47 carrying an upstanding pin 48. On top of the slides 47 there is positioned a cam disc 49 adapted to be oscillated by a lever 50. The cam disc is provided with a series of cam slots 51 cooperating with the pins 48. When the lever 50 is moved in a counter-clockwise direction (Fig. 10), the slides 47 and the pins 48 are moved inwardly into the position shown in Fig. 12. When the handle 50 is moved in a clockwise direction, all of the slides and pins are moved outwardly into the position shown in Fig. 11.

Figure 13:
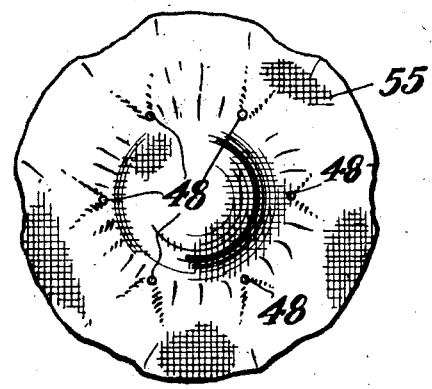
Fig. 13 is a plan view showing a section of fabric as held by the mechanism in Fig. 12.

With the pins 48 in extended relation as shown in Fig. 11, two layers of fabric 55, 55, with a charge of tea 56 between them, are placed on the pins as shown in Fig. 11. The lever 50 is then moved to advance the pins 48 inwardly, thus circumferentially constricting the cloth as shown in Figs. 12 and 13. Held in this position, the two layers of fabric are overseamed together as previously described. It is obvious that the mechanism shown in Figs. 10 to 12 may be used to make an empty bag adapted to be distended into spherical form. Accordingly, it may be used to make the partly completed bag shown in Fig. 1, ready for filling through an opening 17. The bag may then be filled and completed as previously described.

With any of the specific procedures described for making the bag, the stitching is preferably chained off to produce the suspension cord 18; and this cord is preferably stitched to a tag 19 by continuing the stitching operation through the tag.

It will be seen that the present invention provides a tea bag which is adapted to be distended into spherical form when the tea is brewed. Thus, the bag produced by the present invention requires the minimum amount of extraneous material for a given volume of bag, thereby providing a bag which gives ample expansion space for the tea leaves with the introduction of the mathematical minimum amount of gauze into the brew.

The invention may, of course, be embodied in forms other than those particularly disclosed, and the bag may be produced by various manufacturing methods. Accordingly, the foregoing disclosure is merely illustrative in compliance with the patent statutes and is not to be considered as limiting.

I claim:

1. The method of making a tea bag which comprises circumferentially gathering two pieces of sheet material to produce a reduced circumference, and stitching the pieces together along said reduced circumference, whereby the resultant bag is adapted to be distended into spherical form.

2. The method of making a tea bag which comprises placing a quantity of tea between two layers of sheet material, circumferentially gathering the material to produce a reduced circumference, and stitching the layers together along said reduced circumference, whereby the resultant bag is adapted to be distended into spherical form.

3. The method of making a tea bag which comprises circumferentially gathering two pieces of sheet material to produce a reduced circumference, overseaming the pieces together along said reduced circumference, and chaining off the stitching to produce a suspension cord, whereby the resultant bag is adapted to be suspended by said cord in brewing the tea and is adapted to be distended into spherical form in brewing.

4. The method of making a tea bag which comprises circumferentially gathering two pieces of sheet material to produce a reduced circumference, overseaming the pieces together along said reduced circumference, chaining off the stitching to produce a suspension cord, and continuing the stitching through a tag, whereby the resultant bag is adapted to be suspended in brewing tea and is adapted to be distended into spherical form in brewing.

5. The method of making a tea bag which comprises placing a quantity of tea between two layers of sheet material and stitching the two layers together by feeding them to a sewing machine along a circular path, the average linear length of the sheets fed per stitch being greater than the length of a stitch whereby the resultant bag is adapted to be distended into spherical form.

6. The method of making a tea bag which comprises stitching two layers of sheet material together by feeding them to a sewing machine along a circular path, the average linear length of the sheets fed per stitch being greater than the length of a stitch to circumferentially gather the material and produce a resultant bag adapted to be distended into substantially spherical form.

7. The method of making a tea bag which comprises initially shaping each of two pieces of sheet material into generally hemispherical form by placing tea between the two sheets, and then additionally circumferentially gathering the two sheets and overseaming the edges of the two sheets together.

8. The method of making a tea bag or the like which consists in superposing upon one another two pieces of sheet material with their marginal edge portions in face-to-face contact, and their inner portions bulged away from each other, positively bodily moving matching marginal portions inwardly towards the common sheet center and permanently fastening said marginal portions together in the position to which they have been moved.

9. The method of producing a tea bag of substantially spherical shape, which comprises pre-forming each of two similar layers of sheet material into semi-spherical shape, placing tea within the concavity of one sheet, superposing the second sheet above with edges matching and with the concavity of the second sheet extending away from the charge of tea on the first sheet, contracting the combined structure equatorially, and stitching through said matching edges in the position to which they have been moved by such contraction.

SIMON COOPER.